United States Patent
Williamson et al.

[11] 3,796,454
[45] Mar. 12, 1974

[54] PANCAKE TURNERS

[76] Inventors: Allen O. Williamson; George Spector, both of c/o George Spector, 3615 Woolworth Bldg., 233 Broadway, New York, N.Y. 10007

[22] Filed: Aug. 9, 1972

[21] Appl. No.: 278,948

[52] U.S. Cl. ............ 294/7, 206/75, 248/37.6
[51] Int. Cl. ............................. A47j 43/28
[58] Field of Search ............ 294/1 R, 2, 7, 8; 206/16 R, 16 B, 16 D, 45.14, 75; 16/114 R, 115, 116; 211/60 R, 60 T, 87, 69, 123, 124; 248/37.6

[56] References Cited
UNITED STATES PATENTS

| | | | |
|---|---|---|---|
| 2,252,873 | 8/1941 | Vassos et al. | 294/7 |
| 2,487,174 | 11/1949 | Petre | 206/16 R |
| 2,180,572 | 11/1939 | White | 206/16 D |
| 2,522,213 | 9/1950 | Doniger | 211/60 T X |
| 3,236,366 | 2/1966 | Broda et al. | 211/69 X |
| 3,583,556 | 6/1971 | Wagner | 211/69 X |

*Primary Examiner*—Evon C. Blunk
*Assistant Examiner*—Johnny D. Cherry

[57] ABSTRACT

Apparatus used in cooking pancakes comprising: a flat vertical plate having an enlarged bottom section with a horizontally elongated flat top lip, the section having four vertical bores extending downward from the lip. These pancake turning tools each have an elongated member with means at a free end adapted to detachably engage one end of an elongated handle. The handle is disposed detachably in one bore. The members, means pointing downward, are disposed in other corresponding bores.

1 Claim, 3 Drawing Figures

PANCAKE TURNERS

SUMMARY OF THE INVENTION

This Invention is directed toward apparatus used in cooking pancakes in which pancake turning tools can be stored detachably when not in use. To this end, a vertical flat plate is secured detachably to a vertical wall in a position convenient for use. The plate has a bottom section with a top flat horizontal horizontally elongated lip. The section has a plurality of spaced vertical bores. An elongated handle is detachably disposed in one of the bores. Each of the other bores is adapted to detachably hold an elongated member forming part of a corresponding pancake turner tool. The free end of each member has means for detachably engaging the handle. Each member with the means disposed downward fits detachably in a corresponding bore. The upper end of each member is connected with an offset member to a flat rectangular plate which is used to slide under a pancake for turning.

DETAILED DESCRIPTION OF PREFERRED EMBODIMENT

Figure 1:
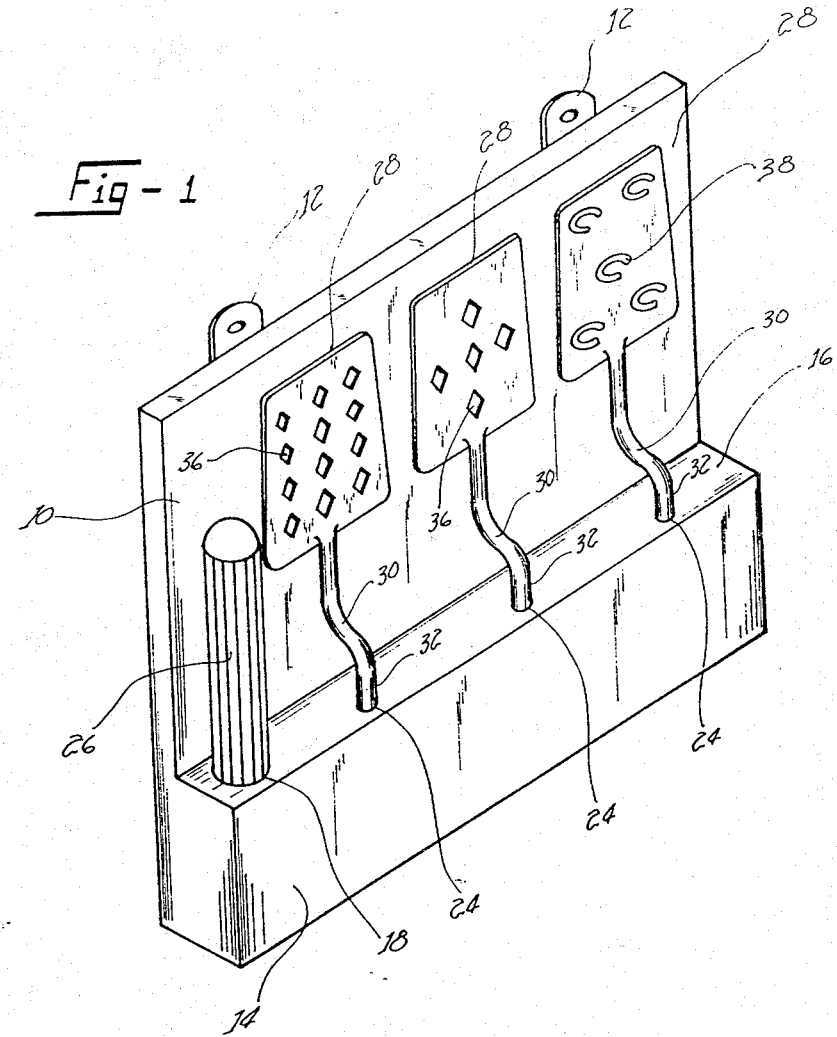
FIG. 1 is a perspective view of this invention.
Figure 2:
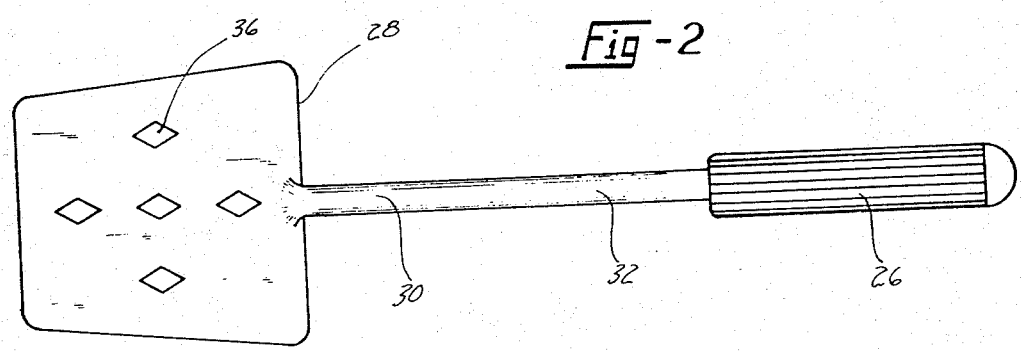
FIG. 2 is a plain view of a pancake turning tool used in the invention.
Figure 3:
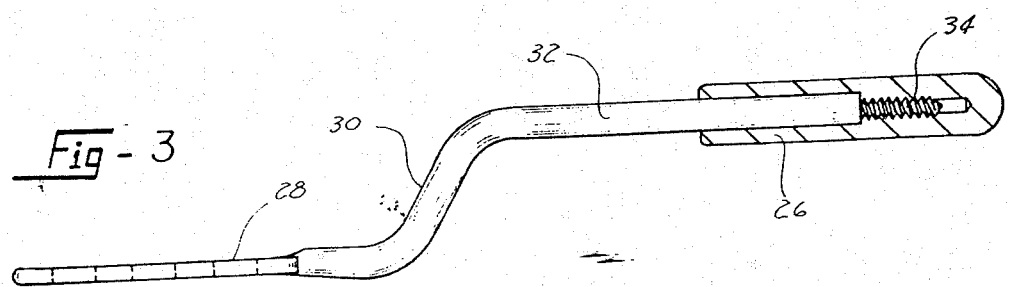
FIG. 3 is a side view of the tool of Figure.

Referring now to FIGS. 1-3, a flat vertical rectangular plate 10 has top disposed ring like members 12 through which screws or other securing means can extend to secure the plate detachably to a vertical wall. Plate 10 has an enlarged bottom section 14 with a top flat horizontal horizontally elongatd lip 16.

The section carries four spaced vertical bores which extend downward from the lip. The first of these bores 18 has a relatively large diameter; the remaining three bores 20, 22 and 24 are all of like smaller diameter.

An elongated cylindrical handle 26 is detachably engageable with bore 18.

The pancake turning tools each having a rectangular pancake turning plate 28 connected via offset 30 to one end of an elongated bar 32. The other end of bar 32 has a reduced diameter screw 34 engageable detachably with a threaded axial bore in handle 26.

Each tool can be connected to the handle for use or can be supported in the plate 10 with bar 32 and screw 34 disposed in one of bores 20, 22 and 24 with plate 28 resting against the surface of the upper portion of plate 10.

The tools differ only in the member and placement of diamond shaped recesses 36 and C-shaped receses 38 incorporated into the plates for the purpose of decoratively shaping the surfaces of pancakes being cooked.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

We claim as follows:

1. A kit for cooking pancakes, comprising a storage rack and a set of pancake cooking tools, said rack comprising a flat rear wall integral at one end thereof with an offset forwardly extending base providing thereby a surface transverse to said wall, said base including a series of spaced holes opening at the said surface spaced from said wall, said base including a planar bottom face parallel to said surface, each of said tools comprising flat plates with decorative recesses connected along a central axis to an offset elongated shaft in combination with a removable handle at the end of said shaft remote from the plate, said shaft end adapted to fit snugly in each said hole, including an enlarged hole adopted to receive the said handle, said holes being in parallel alignment with said wall and wherein the offset of said shafts is such that said plates will abut said wall when said shafts are mounted in said holes.

* * * * *